3,459,615
PROCESS FOR PREPARING REINFORCING FABRIC
FOR ELASTOMERIC PRODUCTS
George E. Eilerman, Pittsburgh, Pa., assignor to PPG
Industries Inc., Pittsburgh, Pa., a corporation of
Pennsylvania
Filed Jan. 26, 1966, Ser. No. 523,182
Int. Cl. B29h 9/04
U.S. Cl. 156—181         6 Claims

ABSTRACT OF THE DISCLOSURE

A process for the rapid production of reinforcing fabric for elastomeric products wherein a weftless warp of reinforcing cord ends is provided with spaced bands of an adhesive to maintain the parallel relationship between the individual reinforcing cord ends during fabrication of a fabric-reinforced elastomeric product.

---

The present invention relates to an improvement in the process of manufacturing fabric-reinforced elastomeric products. More particularly, the present invention relates to an improved method of maintaining the parallel relationship between the individual reinforcing warp strands during fabrication of the fabric-reinforced elastomeric product.

The present invention has application in the fabrication process of many types of fabric-reinforced elastomeric products, but will be discussed hereinafter with respect to its usefulness in the production of pneumatic tires by way of example.

In the present day commercial production process for manufacturing pneumatic tires, the carcass of the tire, made of rubber or other similar elastomeric material, is reinforced by incorporating cords of a reinforcing fabric material circumferentially therein. The circumferentially oriented reinforced cords are then covered with strips of reinforcing fabric that extend into the sidewalls of the tire to provide support and to stiffen the sidewalls. The reinforcing fabrics are formed by weaving cords of relatively low twist.

U.S. Patent 2,902,073, issued Sept. 1, 1959 to Edward T. Lessig, discloses a typical commercial tire construction in which the reinforcing fabric material is such a woven fabric. The fabric is woven to provide the necessary fixed parallel interrelationship of the individual cords in the reinforcing fabric. The reinforcing fabric of the Lessig patent is composed of individual cords having a twist in excess of six turns per inch. These cords are woven such that between 10 and 30 percent of the total area of the reinforcing fabric is interstitial or void area.

The production of typical elastomeric reinforcing fabrics at the present time is accomplished by weaving the cords on a standard textile loom. This is a relatively slow process, and is restrictive in that the cords being woven must not be tacky or excessively rigid.

The present invention provides a rapid method of producing suitable reinforcing fabric which is not limited by the physical properties of the reinforcing cord. The reinforcing cords can be flexible or rigid, dry or tacky, and the rate of production can be many times that of the presently used weaving process.

Broadly, what has been discovered in the present invention is a method of maintaining the parallel relationship of the individual reinforcing cords of a weftless fabric during fabrication of a fabric-reinforced elastomeric product. The method comprises contacting the weftless fabric or warp of reinforcing cords with a ribbon of adhesive material. The ribbon of adhesive material is applied to the warp and then heated to soften the adhesive material. The adhesive is then set by further heating, pressure, or a combination of further heating and pressure to produce a coherent fabric. The final operation is to cool and thus solidify the adhesive material. The warp of reinforcing cords bonded together in this manner maintains the desired parallel relationship between the individual cords throughout the process used to complete the fabrication of the tire.

The present invention will be more clearly understood by making reference to the accompanying figures, in which:

FIG. 2 illustrates a method in which the adhesive material is applied in strips across the width of the warp using a transfer roll apparatus; and in which

The present invention will be more fully understood by making reference to the following detailed examples.

EXAMPLE I

Figure 1:
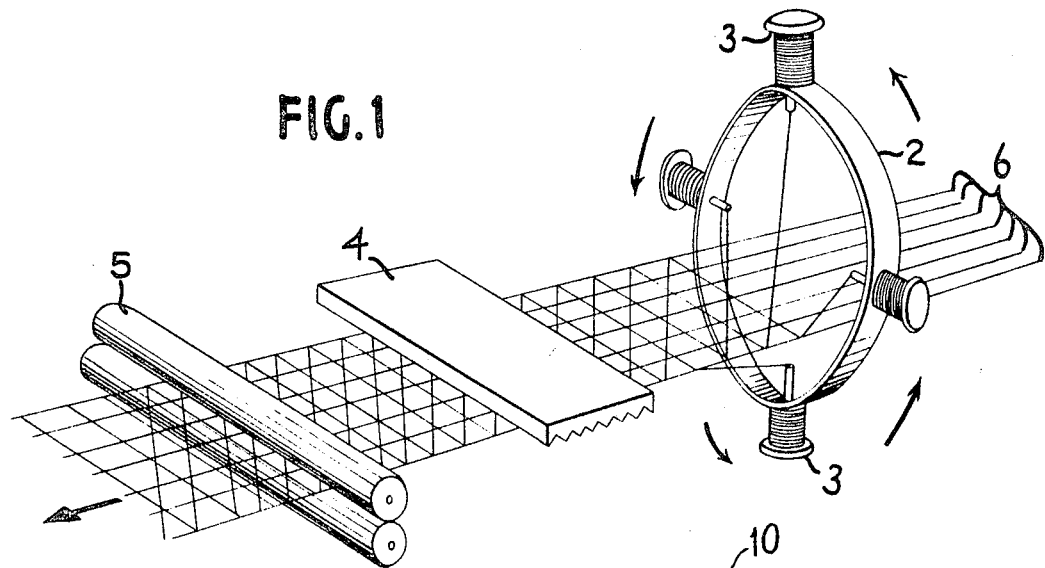
FIG. 1 illustrates a method in which an apparatus provided with a supply of adhesive material in strand form deposits the adhesive on the warp cords from a rotating vertically oriented wheel.

In this example, an adhesive strand is deposited about a warp of reinforcing cords, as shown in FIG. 1. The adhesive strand supply is wrapped about bobbins 3, mounted on the support ring 2 of the apparatus. During operation, a warp of reinforcing cords 6 is drawn through the center of the support ring, as shown in FIG. 1, while the support ring is rotated about an axis parallel to the direction of warp draw. A strand of adhesive material from each bobbin is thus wrapped about the warp of reinforcing cords. The rate of ring rotation, the speed of warp draw through the center of the support ring and the number of strand supply bobbins being used determines the separation distance between the strands of adhesive material deposited on the warp.

In this method also, the angle of adhesive strand deposit about the warp cords is also dependent on the variables indicated above and can be controlled to produce the most favorable design in the final reinforcing fabric. The separation distance between adjacent strands of the adhesive material can be varied as desired, but is usually between about ¼ inch and 1 inch. The adhesive strand separation distance is in part dependent upon the number of cords in the warp (ends per inch).

After the adhesive strand has been deposited as desired, the wrapped warp ends are heated to between 250° F. and 300° F. to soften and set the adhesive. A radiant heating means 4, of FIG. 1, is preferred, such as a bank of infrared lamps. The wrapped warp ends are then passed between pressing rolls 5 to place the adhesive and the warp ends in intimate contact. The wrapped warp ends are then cooled to room temperature to fix the adhesive and hold the warp ends in place.

The preferred adhesive material of Example I is a polypropylene fiber of softening point 250° F.–300° F. Other polymers and copolymers, such as polystyrene, polyisoprene, polyvinyl acetate, ethylene propylene copolymer, silicone polymers, etc., may also be used. Various thermoplastic resins and extruded composite materials coated with a suitable adhesive may also be applied using the apparatus of Example I to bond the warp ends of a reinforcing fabric.

EXAMPLE II

Figure 2:
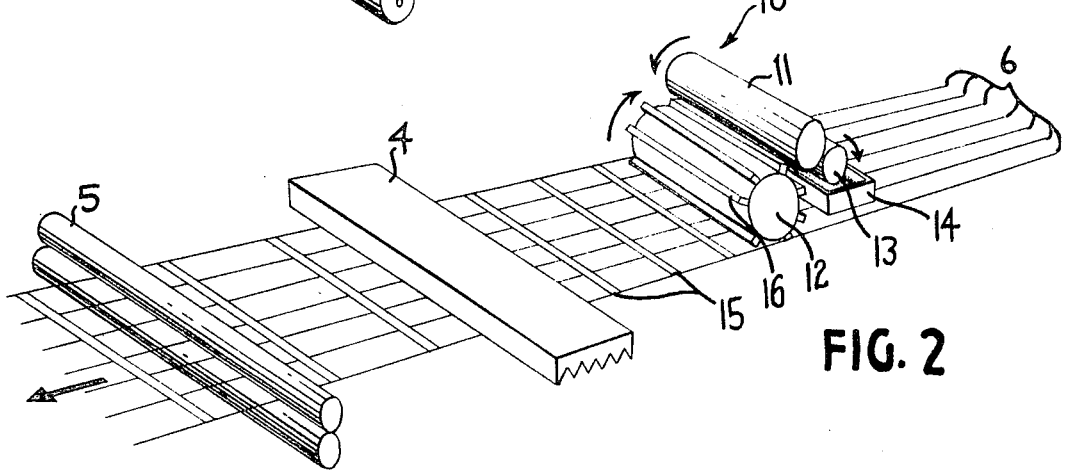

In this example, adhesive material is deposited in narrow individual strips across the width of the parallel warp ends. This technique is illustrated in FIG. 2. The adhesive application mechanism is a set of transfer rolls 10. Roll 13 of the transfer roll mechanism is partially immersed in a reservoir 14 containing the adhesive material. Roll 13 is then rotated to transfer a quantity of the adhesive material to an intermediate roll 11, which in turn deposits the adhesive material on the brushes or rubber take-off strips 16 of the adhesive depositing roll 12. As the depositing roll rotates, it deposits the adhesive material in strips 15 on the upper surface of the parallel warp ends.

The adhesive coated warp ends are then heated, pressed and cooled as in Example I to complete the fabrication of the reinforcing fabric.

The preferred adhesive material in this example is plasticized polyvinyl chloride resin, heated to a temperature between about 250° F. and 350° F. The other copolymers indicated as alternatives in Example I may also be used.

This particular technique for depositing the adhesive material has the advantage that it may be used when the adhesive material to be applied cannot be used in the form of a strand.

EXAMPLE III

Figure 3:
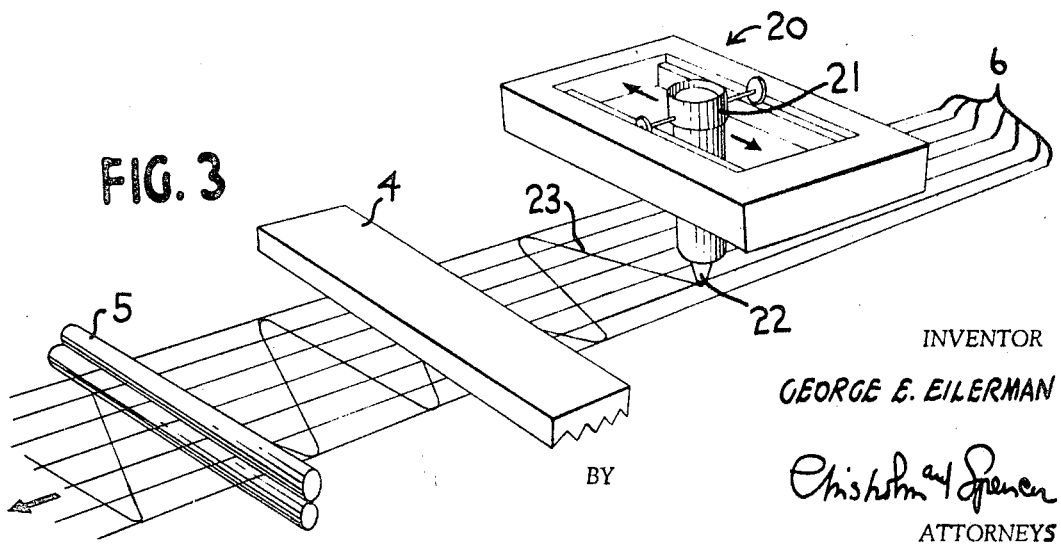
FIG. 3 illustrates a method in which the adhesive material is applied from a horizontally reciprocating source to deposit the adhesive in a pattern roughly corresponding to the shape of a continuous sine wave along the warp.

The method of this example is illustrated in FIG. 3. The adhesive material is supplied from a reciprocating reservoir 21 positioned above the warp ends. The adhesive material 23 deposits in a pattern corresponding roughly to the shape of a sine curve.

The adhesive coated warp ends are then heated, pressed and coated as in Example I to complete the fabrication of the reinforcing fabric.

The preferred adhesive material in Example III is also plasticized polyvinyl chloride resin, and any of the other materials indicated as alternatives in Example I may also be used.

All of the methods of producing a reinforcing fabric described above in the examples permit a much higher rate of fabric production than the loom weaving techniques presently employed.

The present invention, regardless of which of the three application means selected, provides the needed integrity to the warp fabric to permit handling and fabrication of the final elastomeric reinforced product.

The techniques herein disclosed are easily adapted to high-speed automated production means making them commercially attractive as a replacement for the slow presently employed weaving process.

While the present invention has been described in terms of specific examples, the scope of the invention should only be limited by the language of the appended claims.

I claim:

1. In the process of manufacturing reinforcing fabric for reinforced elastomeric products such as pneumatic tires, the improvement comprising contacting a weftless warp of reinforcing cord ends with spaced bands of an adhesive, heating and pressing the adhesive contacted warp ends to promote intimate contact of the adhesive and the individual cords of the warp and thereafter cooling the adhesive contacted warp ends.

2. A process according to claim 1 in which the adhesive contacting the weftless warp of reinforcing cord ends is in strand form.

3. A process according to claim 1 in which the adhesive contacting the weftless warp of reinforcing cord ends is deposited transversely across the warp and substantially normal to the individual cords of the warp.

4. A process according to claim 1 in which the adhesive contacting the weftless warp of reinforcing cord ends is deposited in a pattern substantially the shape of a continuous sine wave in the plane defined by the weftless warp.

5. A process according to claim 1 in which the heating of the adhesive is accomplished using radiant heating means.

6. A process according to claim 1 in which the adhesive material is selected from the group consisting of plasticized polyvinyl chloride, polypropylene, polystyrene, polyisoprene, polyvinyl acetate, ethylene propylene copolymer and silicone polymer.

References Cited

UNITED STATES PATENTS

| 2,147,736 | 2/1939 | Dreyfus | 161—91 |
| 3,388,030 | 6/1968 | Estes et al. | 156—180 X |
| 1,520,342 | 12/1924 | Grabau | 156—180 X |
| 2,757,111 | 7/1956 | Henderson | 156—180 X |
| 3,067,084 | 12/1962 | Nalle | 156—180 X |
| 3,095,338 | 6/1963 | Romanin | 156—181 X |
| 3,379,596 | 4/1968 | Stutz | 156—434 |

FOREIGN PATENTS 6,403,980  10/1964  Netherlands.

HAROLD ANSHER, Primary Examiner

U.S. Cl. X.R.

156—291, 306, 311, 434, 441; 161—150